Jan. 18, 1949.    C. STEWART, JR    2,459,197
METHOD OF MEASURING CHARACTERISTIC IMPEDANCE
OF FITTINGS FOR COAXIAL CONNECTORS
Filed Aug. 11, 1944    2 Sheets-Sheet 2
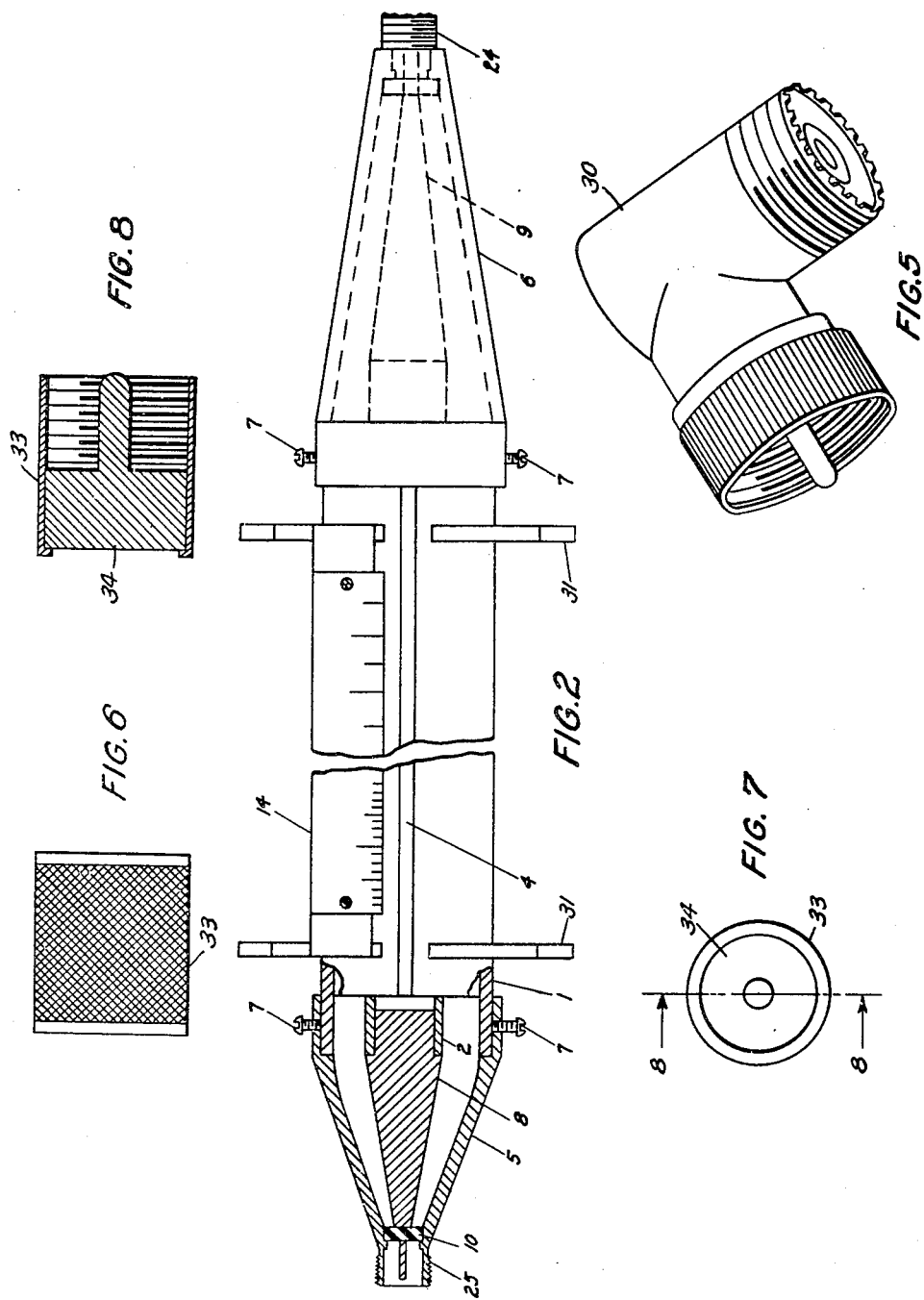
INVENTOR.
CHANDLER STEWART JR.
BY William D. Hall.
ATTORNEY Patented Jan. 18, 1949

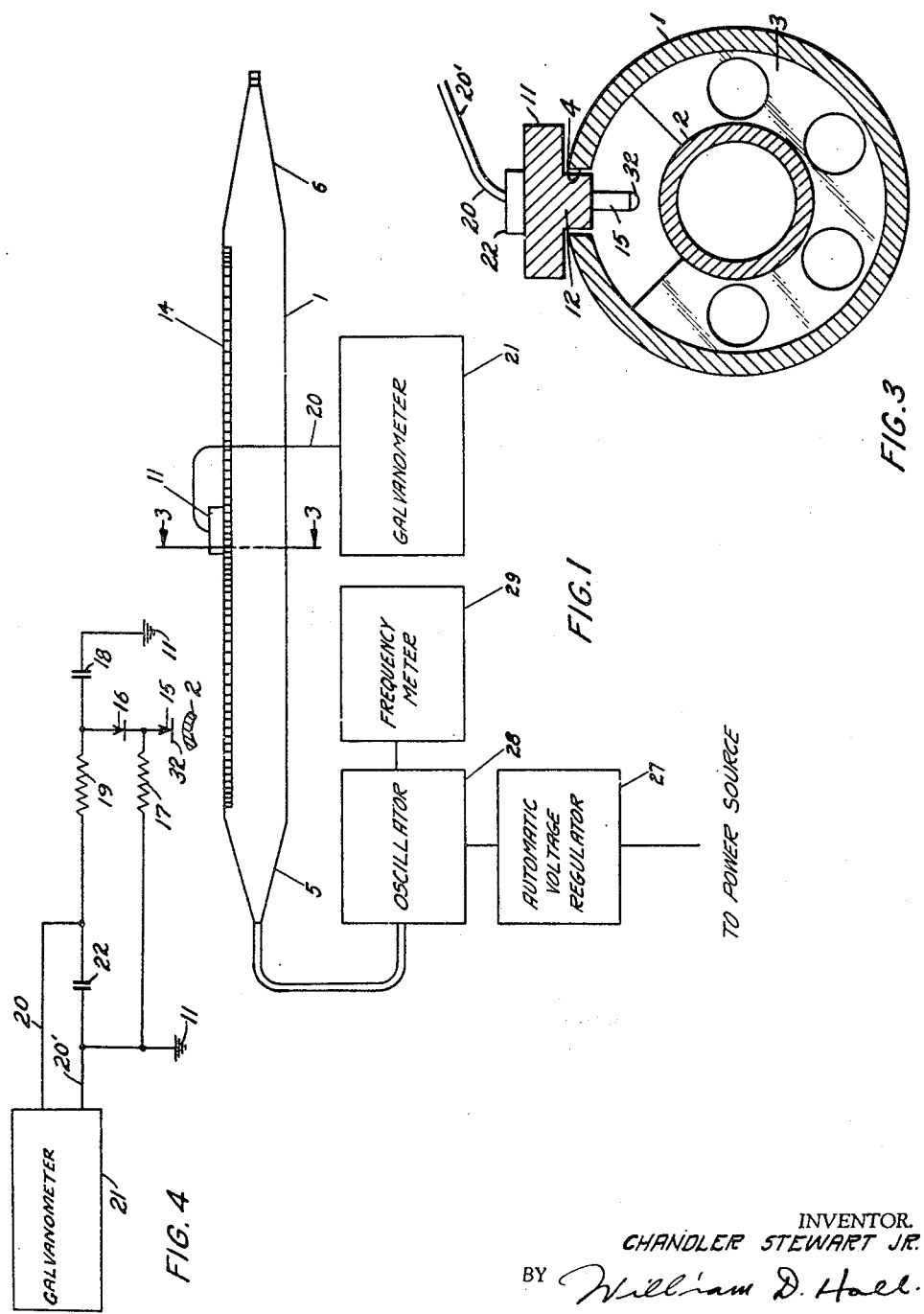

2,459,197

UNITED STATES PATENT OFFICE 2,459,197

METHOD OF MEASURING CHARACTERISTIC IMPEDANCE OF FITTINGS FOR COAXIAL CONNECTORS

Chandler Stewart, Jr., Dayton, Ohio, assignor to the United States of America as represented by the Secretary of War Application August 11, 1944, Serial No. 549,088

3 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method for evaluating electrical connectors and more particularly to a method of measuring the characteristic impedance of ultra high frequency coaxial cable connectors and the like by a slotted line null shift method that yields readings in characteristic impedance directly.

Methods used in the past for determining characteristic impedance in conductors have yielded results in terms of reflection coefficients. The older procedures have been characterized by the limitations that the magnitude and sense of errors due to reflections that were introduced by the connectors at either of the ends of the test cables were unknown; that the results were dependent upon the characteristics of the plugs and sockets with which the fittings were tested; that the results that were obtained at one frequency could not be compared with those that were obtained at another frequency because the reflection coefficients are functions of frequency; that testing at more than one frequency is impracticable because the real and imaginary components of the load must be adjusted separately and the indicator retuned for each frequency used, which procedure in practice has been found to consume considerable working time; that the results of reflection coefficient tests give an indication of the degree of the effect of impedance mismatch that is introduced at the test frequency, but these tests do not provide data from which a procedure for correcting this limitation may be developed; that readings taken from a slotted line indicator heretofore could not be used directly but must be corrected by means of reference to a calibration chart which is a further source of possible error; and that tests could not be made on fittings that were designed for impedances other than the characteristic impedance of the line.

The objects of the present invention include the provision of a method for minimizing or eliminating the above designated limitations that have characterized the older methods; the method for making determinations that read directly in terms of the characteristic impedance of a sample; and to provide a simplified and improved method for running characteristic impedance determinations on connectors for ultra high frequency coaxial cables and the like by the use of apparatus such as that shown in the accompanying drawings, wherein:

Fig. 1 is a block diagram of an assembly of equipment that is used in running the determinations that are considered herein;

Fig. 2 is a foreshortened plan view of the slotted transmission line part of the assempy that is shown in Fig. 1, with parts broken away and in axial section to show the assembly thereof;

Fig. 3 is a transverse section taken along line 3—3 in Fig. 1 with an end support shown, and a transverse sectional view of an indicator removably mounted upon the slotted line;

Fig. 4 is a circuit diagram of an indicator with probe, with its connection to a galvanometer indicated, that is used with the slotted line that is shown in Fig. 2, in obtaining data from which the characteristic impedance of the samples are obtained;

Fig. 5 is a perspective view of an elbow connector that is commonly used as an electrical fitting and that is illustrative of an electrical fitting sample whose characteristic impedance can be determined by use of the assembly that is shown in Fig. 1 upon being attached to the test end of the slotted line that is shown in Fig. 2;

Fig. 6 is a side elevation of the sleeve part of a shorting plug assembly that is used to short the test end of the line that is shown in Fig. 2 and samples that may be applied thereto;

Fig. 7 is an open end elevation of the shorting plug assembly; and

Fig. 8 is a section taken along the line 8—8 of Fig. 7 looking in the direction indicated by the arrows.

The apparatus that is used for running determinations of characteristic impedance of connector fittings and the like that is disclosed herein, comprises a slotted line that consists of a hollow cylindrical outer conductor 1 that is coaxial with a cylindrical inner conductor tube 2 with an air space interposed therebetween. A plurality of insulating polystyrene supports 3, one of which is preferably disposed at each end of the inner conductor 2, are interposed between the outer conductor 1 and the inner conductor 2 in order that they be maintained in coaxial relation with respect to each other. A slot 4 extends longitudinally of the outer conductor 1 for the length thereof.

A short conical conductor tip 5 is mounted upon one end of the outer conductor 1 and a longer conical conductor testing tip 6 is mounted upon the opposite end thereof. The conductor tips 5 and 6 are secured to the outer conductor 1 in any desired manner as by means of a plurality of radially extending screws 7 that thread through the conductor tips 5 and 6 adjacent the bases thereof, and are tightened against the outer surface of the conductor 1 adjacent the ends thereof. The smaller ends of the conductor tips 5 and 6 terminate in hollow cylindrical portions that are threaded externally to receive connectors thereon, and that provide outer contacts for fixed connectors 25 and 24 respectively.

Conical inner conductor rods 8 and 9 are coaxial with the conductor tip 5 and the conductor test tip 6, respectively, with insulating polystyrene spacers 10 interposed therebetween. The larger ends or bases of the rods 8 and 9 make electrical connections with the inner conductor 2 by slipping thereinto or the like. The smaller end of the rod 8 terminates in a central pin contact for the connector 25. The smaller end of the rod 9 is tapped and split axially to provide a central female contact for the test connector 24. The central contacts so provided are adapted for engaging the central contacts of electrical fittings which may be joined electrically to the feed connector 25 and the test connector 24.

A travelling standing wave indicator 11 has a guide 12 extending longitudinally of the lower side thereof. The guide 12 is dimensioned to fit snugly within the slot 4 in the outer conductor 1 and to guide the indicator 11 as it is moved longitudinally of the outer conductor 1. An arrow or other reference point is provided on the lateral edge of the indicator 11 so that it can be brought into registration successively against marks on a distance scale 14. The scale 14 is mounted upon the outer conductor 1 beside the slot 4 therein and reads in centimeters or inches as preferred.

The indicator 11 has a probe 15 depending centrally therefrom and terminating out of contact with the inner conductor 2. The probe 15 comprises a pick up capacitor 32 at its lower extremity and a vacuum tube, thermocouple, or crystal 16 that is disposed within a protective insulating tube or the like. One end of the crystal 16 is connected through a resistor 17 to a point of fixed reference potential represented by the ground symbols of Figure 3. The point of reference potential preferably is the guide 12 of indicator 11. The opposite end of the crystal 16 is connected through a condenser 18 with the grounded indicator 11 and through a resistor 19 to one connecting wire 20 that leads to a slideback voltmeter or a galvanometer 21. The other connecting wire 20' from the galvanometer 21 is grounded to the indicator 11. A capacitor 22 shunts line 20 to ground.

End connector 24 is mounted upon the unattached end of the conical testing tip 6 and inner conducting rod 9. The characteristic impedance of the connector 24 is equal to that of the slotted line. A fitting 25 is mounted upon the conical tip 5 at the input end of the line and has the same characteristic impedance as the line. Suitable connecting means such as a coaxial cable or the like, connects the fitting 25 with an oscillator 28, and with a frequency meter 29 coupled in the circuit. Oscillator 28 is connected with a power source through voltage regulator 27.

An elbow connector 30 is illustrative of electrical connectors whose electrical impedance may be determined by the equipment and the methods that are disclosed herein. A shell 33 and a shorting plug 34 are illustrative of a shorting device for short-circuiting the slotted line or a test sample connector. The test sample connector 30 may be removably mounted upon the connector 24 at the unattached end of the conical testing tip 6. The shell 33 with the shorting plug 34 disposed therein may be removably mounted upon the test connector 24 for shorting the line, or upon the end of the test sample-connector 30 for shorting the connector 30 when it is mounted upon the test connector 24. The slotted line assembly is suitably supported externally, as by a plurality of transversely disposed supports 31 or the like, that are secured to a base, not shown.

The method of using the above described apparatus in the determination of the characteristic impedance of connectors, fitting adaptors, and the like, is based upon the relationships that are expressed in the hereinafter derived equation:

$$Z_c = Z_0 \sqrt{\frac{\Delta S_s}{\Delta S_0}}$$

In this equation the quantity $Z_c$ is the characteristic impedance of the sample fitting, or the like, that is under test. The quantity $Z_0$ is the characteristic impedance of the particular slotted line that is used in making the tests and is constant for any given line and hence is a known constant in the above equation. The quantities $\Delta S_s$ and $\Delta S_0$ are computed from four readings on the scale 14 of positions of the indicator arrow that are obtained as hereinafter described. In obtaining these readings the phenomenon of the standing wave of voltage on the slotted line is made use of. The points of null, or minimum, voltage along the slotted line are points of zero, or minimum, impedance and are located by moving the indicator 15 along the line until the galvanometer 21 indicates zero, or a minimum voltage. The corresponding scale readings are called null positions and are recorded.

The operational procedure is as follows: The line is first short-circuited by inserting the pointed end of the shorting plug 34 into the hollow cylindrical central contact of the test connector 24. The shell 33 is then positioned over the shorting plug 34 and is threaded upon the test connector 24 and drawn snugly tight to fully seat the shorting plug 34 within the central contact of the connector 24.

The indicator 11 is then applied to the outer conductor 1 by the disposition of its guide 12 into the slot 4 therein near the input end of the outer conductor 1 and between a pair of the supports 3. The indicator 11 is then adjusted for the null position with the slotted line shorted. This reading is recorded.

The shell 33 and the shorting plug 34 are then removed from the connector 24. The indicator 11 is again moved along the slotted line and the reading at the null position, with the slotted line test end open circuited, is made.

The sample connector 30, or other sample whose impedance is to be determined, is then mounted upon the connector 24 at the test end of the slotted line. The null or minimum reading of the open circuited sample is then taken and recorded.

The sample to be tested is then shorted by the application thereto of the shorting plug 34 and the shell 33, or is shorted in other suitable manner for the particular type of device that is under test, and the minimum reading of the shorted sample is taken and recorded.

The difference between the reading of the slotted line shorted and the test sample shorted then provides the value $\Delta S_s$ for substitution in the above equation. The difference between the reading of the slotted line with its test end open circuited and with the sample applied thereto open circuited provides the value $\Delta S_o$ for substitution in the above equation.

The quantities $Z_0$, $\Delta S_s$, and $\Delta S_o$ are then substituted in the above equation and the equation is solved for the value of $Z_c$, which is the characteristic impedance of the sample. The determinations so made will meet the requirements of production testing, and will also yield information that is required for making improvements in design. The evaluations of a limited group of fittings, such as right angle adaptors, bulkhead plugs, splicing connectors and the like, may be made in a similar manner.

The coefficients of reflection of slotted lines to the test ends of which coaxial cables are attached, may also be obtained by the use of equipment that is disclosed herein. In these determinations calibrated tuned indicators have been used experimentally to determine the voltages on the line.

The formula for $Z_c$ is derived as follows, wherein the symbols have the following meanings:

$\beta$ = wavelength constant of slotted line in radians per centimeter.
$\beta_c$ = wavelength constant of fitting in radians per centimeter.
$l_c$ = electrical length of fitting in centimeters.
$l_m$ = distance along slotted line from the end to point of minimum voltage in centimeters.
$l_{co} = l_m$ for line terminated in open circuited fitting.
$l_{cs} = l_m$ for line terminated in short circuited fitting.
$l_{so} = l_m$ for open circuited line.
$l_{ss} = l_m$ for short circuited line.
$\Delta S_o$ = line null shift in centimeters due to changing line load from open circuit to open circuited fitting = $l_{co} - l_{so}$.
$\Delta S_s$ = line null shift in centimeters due to changing line load from short circuit to short circuited fitting = $l_{cs} - l_{ss}$.

$X$ = reactance termination of slotted line, in ohms.
$Z_c$ = characteristic impedance of fitting, in ohms.
$Z_0$ = characteristic impedance of slotted line, in ohms.
$Z_{co}$ = input impedance of open circuited fitting, in ohms $\cong jX_{co}$.
$Z_{cs}$ = input impedance of short circuited fitting, in ohms $\cong jX_{cs}$.
$jX_{co}$ = input reactance of open circuited fitting.
$jX_{cs}$ = input reactance of short circuited fitting.

From the theory of the lossless transmission line there holds, (1) $\qquad X = Z_0 \tan \beta l_m$ Also for the short circuited fitting regarded as a line, (2) $\qquad Z_{cs} = jZ_c \tan \beta_c l_c$
(2a) $\qquad X_{cs} = Z_c \tan \beta_c l_c$ For the case of the line terminated by a short circuited fitting, $X$ becomes $X_{cs}$, and $l_m$ becomes $l_{cs}$, so that combining (1) and (2a) yields (3) $\qquad -Z_0 \tan \beta l_{cs} = Z_c \tan \beta_c l_c$ For conditions encountered in practice, (4) $\qquad \beta_c l_c \ll \dfrac{\pi}{4}$ and (5) $\qquad Z_c \cong Z_0$ These justify the following approximation of (3):

(6) $\qquad -Z_0 (\beta l_{cs} - \pi) = Z_c \beta_c l_c$

For the uniform line, $\beta l_{ss}$ becomes $\pi$;

(7) $\qquad \beta \Delta S_s = \beta l_{cs} - \beta l_{ss} = -\dfrac{Z_c \beta_c l_c}{Z_0}$ Similarly to (2) and (2a) there holds for the open circuited fitting regarded as a line (8) $\qquad Z_{co} = -jZ_c \cot \beta_c l_c$
(8a) $\qquad X_{co} = -Z_c \cot \beta_c l_c$ For the case of the line terminated by the open circuited fitting $X$ becomes $X_{co}$, and $l_m$ becomes $l_{co}$, so that the combination of (1) and (8a) yields (9)
$$-Z_0 \tan \beta l_{co} = -Z_c \cot \beta_c l_c = -Z_c \tan \left( \dfrac{\pi}{2} - \beta_c l_c \right)$$

From (4), (5), and (9), this is approximately

(10) $\qquad \beta l_{co} = \dfrac{\pi}{2} - \dfrac{Z_0 (\beta_c l_c)}{Z_c}$

For the uniform line $\beta l_{ss}$ becomes $\pi/2$, so that from (10),

(11) $\qquad \beta \Delta S_0 = \beta l_{co} - \beta l_{so} = -\dfrac{Z_0 \beta_c l_c}{Z_c}$ Dividing (7) by (11), we obtain

(12) $\qquad \dfrac{\Delta S_s}{\Delta S_0} = \dfrac{Z_c^2}{Z_0^2}$ and since $Z_c$ is always positive, (12a) $\qquad Z_c = Z_0 \sqrt{\dfrac{\Delta S_s}{\Delta S_0}}$ Thus, the validity of the formula used to measure $Z_c$ has been established.

It is to be understood that the application of the herein disclosed method to the apparatus that is illustrated, has been disclosed for the purpose of illustrating and describing the present invention and the various changes in the particular procedure specified, and modifications in the equipment used may be made without departing from the present invention as defined in the appended claims.

What I claim is:

1. A method of determining the unknown characteristic impedance of a pair of spaced electrical conductors from a known value of characteristic impedance and four measured linear distances including the steps of supplying electrical energy to one end of a measuring line of known characteristic impedance, and measuring the following distances in any order by any known means; the distance from the second end of said measuring line to the first point of voltage minimum along the line with said second end open circuited, the distance from said second end to the first point of voltage minimum along said line with said second end short circuited, the distance from said second end to the first point of voltage minimum along the line with the pair of conductors to be tested attached to said second end with the unattached end of said pair of conductors open circuited, and the distance from said second end to the first point of voltage minimum along the line with the pair of conductors to be tested attached to said second end with the unattached end of said pair of conductors short circuited, whereby the characteristic impedance of said pair of conductors may be computed from the characteristic impedance of said measuring line and the four measured distances.

2. A method of measuring the characteristic impedance of a pair of spaced electrical conductors including the steps of continuously supplying oscillatory energy to one end of a measuring line provided with means for indicating points of minimum voltage along said line, short circuiting a second end of said measuring line, indicating the position of a selected point of minimum voltage on said line, removing the short circuit from said second end of said line, indicating the new position of said selected point of minimum voltage, attaching said pair of spaced conductors to be tested to said second end of said measuring line, indicating the third position of said point of voltage minimum, short circuiting the unattached end of said pair of conductors, and indicating the fourth position of said selected point of minimum voltage whereby the characteristic impedance of said pair of conductors under test may be determined from the characteristic impedance of said measuring line and the position of said four indicated points with respect to said second end of said measuring line.

3. A method of measuring the characteristic impedance of a pair of spaced conductors comprising, continuously supplying oscillatory energy to one end of a slotted line, short circuiting a second end of said line, moving a probe along said slotted line to a point of minimum voltage indicated by an indicator associated with said probe, removing said short circuit at said second end of the slotted line, moving said probe to a new point of voltage minimum shown by said indicator, attaching one end of the spaced conductors under test to said second end of the slotted line, moving said probe to a third point of voltage minimum on said slotted line, short circuiting the unattached end of said spaced conductors and moving the probe to still a fourth position of voltage minimum whereby the characteristic impedance of the spaced conductors under test may be computed from the known impedance of said slotted line and the relative distances of said four points of voltage minimum from said second end of said slotted line.

CHANDLER STEWART, JR.

REFERENCES CITED

The following references are of record in the file of this patent:

UNITED STATES PATENTS

| Number | Name | Date |
|---|---|---|
| 1,841,473 | Green | Jan. 19, 1932 |
| 1,932,448 | Clavier | Oct. 31, 1933 |
| 2,191,271 | Carter | Feb. 20, 1940 |
| 2,337,934 | Scheldorf | Dec. 28, 1943 |

OTHER REFERENCES

Practical Analysis of Ultra High Frequency, by J. R. Meagher and H. J. Markley; R. C. A. Service Co. Inc., Camden, N. J.; August 1943; pp. 11–12. (Copy in Division 65.)